United States Patent
Kucera et al.

(10) Patent No.: US 7,616,759 B2
(45) Date of Patent: Nov. 10, 2009

(54) TELEPHONE LINE SWITCHING DEVICE

(76) Inventors: Robert J. Kucera, P.O. Box 27951, Concord, CA (US) 94527; Beverly Ann Kucera, P.O. Box 27951, Concord, CA (US) 94527

( * ) Notice: Subject to any disclaimer, the term of this patent is extended or adjusted under 35 U.S.C. 154(b) by 341 days.

(21) Appl. No.: 11/304,844

(22) Filed: Dec. 14, 2005

(65) Prior Publication Data

US 2007/0133772 A1    Jun. 14, 2007

(51) Int. Cl.
*H04M 1/00* (2006.01)
*H04M 9/00* (2006.01)

(52) U.S. Cl. ........................ 379/423; 379/422

(58) Field of Classification Search ................. 379/422, 379/423

See application file for complete search history.

(56) References Cited

U.S. PATENT DOCUMENTS

| | | | | |
|---|---|---|---|---|
| 4,924,213 A | * | 5/1990 | Decho et al. ............... | 340/653 |
| 4,998,275 A | * | 3/1991 | Braunstein et al. .......... | 379/164 |
| 5,903,643 A | * | 5/1999 | Bruhnke ................. | 379/413.04 |
| 6,118,777 A | * | 9/2000 | Sylvain ...................... | 370/351 |
| 6,307,933 B1 | * | 10/2001 | Stehlin et al. .......... | 379/413.03 |
| 6,363,079 B1 | * | 3/2002 | Barzegar et al. ............ | 370/465 |
| 6,687,374 B2 | * | 2/2004 | Leuca et al. ............ | 379/413.04 |
| 6,823,064 B1 | * | 11/2004 | Korman et al. .............. | 379/333 |
| 7,203,306 B2 | * | 4/2007 | Bain et al. .................. | 379/306 |

* cited by examiner

*Primary Examiner*—Alexander Jamal

(57) ABSTRACT

A switching device for providing selective telephone access to multi-telephone line and data line sources. The device can be incorporated within a compatible device or configured as a stand-alone, self-contained device. In the later configuration, it includes a housing, an input port for receiving multiple telephone or data lines and an output port for connecting a compatible device, such as a computer modem, to one of the telephone lines. Switching means are provided for selectively connected the compatible device to one of the multi-telephone or data line sources and for selectively blocking access to the multi-telephone or data line sources. Indicator means are further provided for identifying which of the multi-telephone or data line sources are being connected to the compatible device and whether access is being blocked to the multi-telephone or data line sources.

19 Claims, 5 Drawing Sheets ized patent document.

TELEPHONE LINE SWITCHING DEVICE

TECHNICAL FIELD

The present invention involves a switching device for making practical use of multi-telephone line sources in both residential and business applications. This switch, being either self-contained or embedded into an existing device, is capable of operating as an add-on feature to virtually any compatible device designed to receive and to interface with any phone line circuitry such as one emanating from the central office of a commercially available telephone network or switching system, including line transmission of television broadcasts and data transmission.

BACKGROUND OF THE INVENTION

In the past, one wishing to establish access to a telephone network would simply have a professional install a suitable phone jack with standard connectors intended to act as the female connection to a compatible jack functionally wired to a telephone or telephone base station. However, it was not long before residential telephone customers began installing multiple lines for multiple telephone handsets and other compatible devices such as computers housing computer modems and fax machines.

Although one could wire separate telephone lines to each phone jack, it is often times felt to be more desirable to wire multiple lines that would be available at each jack. Specifically, multiple inner conductors and outer conductors of a phone jack are provided such that, for example, three different telephone lines can be wired to a single jack and accessed by the above-noted telephones and other compatible devices. As such, pairs of conductors for each line referred to as a tip and ring pair are fed to each jack each operating at a line voltage, typically a nominal −48 or −24 volts across the tip and ring pair of the line. Such jacks can also be expanded to an additional line for other data transfer including television content.

Although commonly available multi-line telephones can be employed in the above-described multi-line telephone jack installations, difficulties arise when fax machines and computer modems are employed, either alone, or together with standard telephone handsets and base stations. For example, unless connected to a dedicated telephone line, current devices can only access line 1 of a multi-line jack. One wishing to access the worldwide web in such an installation over a dial up modem could be blocked from such access as the line being employed for this purpose may be busy or "off hook" when another compatible device is in use. The present invention can be used on any device utilizing telephone line connectivity.

It is thus an object of the present invention to provide a self-contained switching device capable of selectively attaching a compatible device, utilizing telephone line connectivity, such as a computer modem, fax machine, and telephone to a multi-telephone line source in order to marshal these resources and enable such compatible devices to operate simultaneously while avoiding those difficulties recited above.

These and further objects will be more readily apparent when considering the following disclosure and appended claims.

SUMMARY OF THE INVENTION

The present invention involves a switching device for providing selective telephone or data line access to multi-telephone and other compatible line sources. For the sake of convenience, all such line sources will be identified as "telephone" line sources, although such sources can include data transmission and television transmission, among others. The device comprises an input port for receiving multiple lines and an output port for connecting a compatible device, such as a fax machine, computer modem or any other device that utilize telephone line connectivity to one of the multi-telephone line sources and for selectively blocking access to the multi-telephone line sources. Indicator means are provided for identifying which of the multi-telephone or data line sources is being connected to the compatible device and whether access is blocked to the multi-telephone data or line sources. This device can be incorporated into its own housing for use as a stand alone switching means.

DETAILED DESCRIPTION OF THE INVENTION

Figure 5:
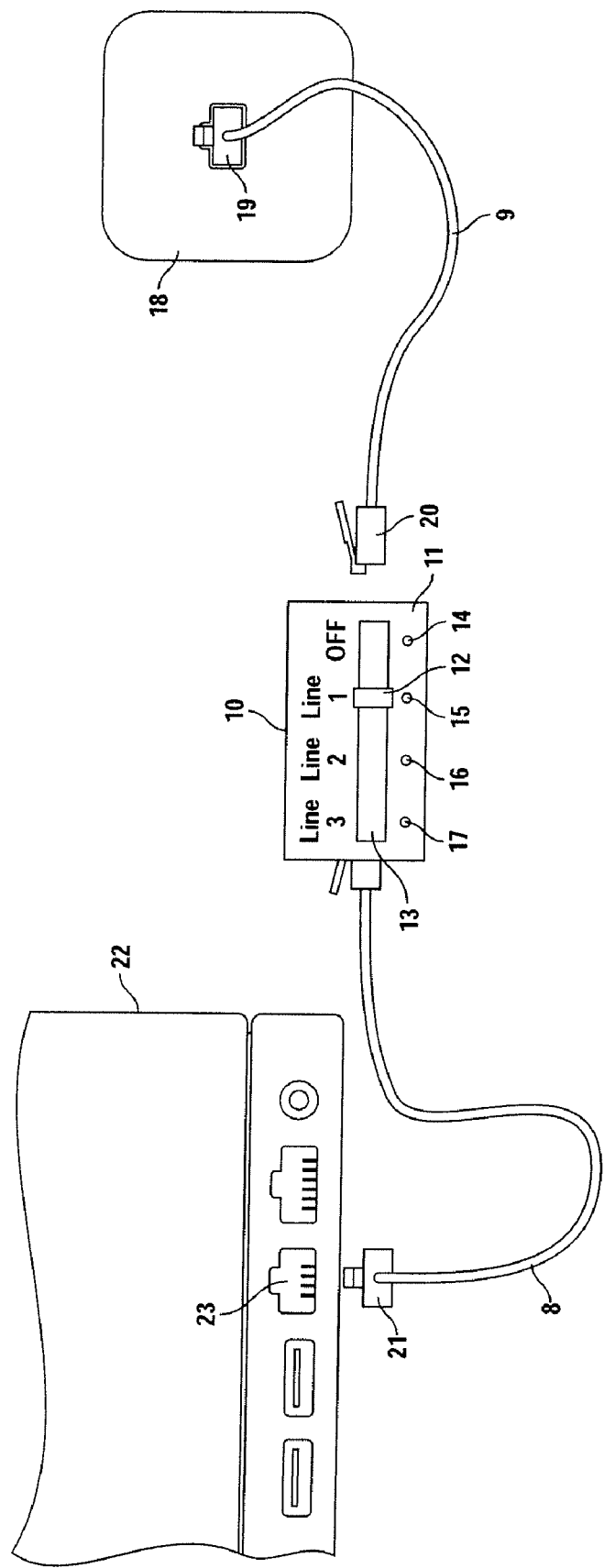
FIG. 5 is an illustration of the present device as it is intended to interface with a suitable wall outlet and compatible device in practicing the present invention.

Turning first to FIG. 5, an example of the present invention as a stand-alone, self-contained switching device 10 is depicted. It should be appreciated, however, that the present switching device could be incorporated into a compatible product either as an add on feature or when such compatible product is constructed, thus eliminating the need for its own housing. FIG. 5 shows device 10 functionally connected to jack 18 having inner conductors within female receptacle 19 (not shown). Typically, inner conductors contained within female connector 19 could communicate multiple telephone lines through jumper cable 9 and male connector 20. Alternatively, jumper 9 could be permanently hard wired to stand alone, self-contained switching device 10 providing for selective connectivity to wall outlet 18 through a suitable male connector received by port 19.

Continuing with this illustration, a multi-telephone line source emanating through jumper 9 is received by stand alone, self-contained switching device 10 through male connector 20. Device 10 is contained within housing 11 composed of, preferably, injection molded plastic parts. Housing 11 includes a channel 13 to facilitate lateral sliding movement of selector 12.

Selector 12, in moving across channel 13 enables stand alone, self-contained switching device 10 to assume one of a number of selectable orientations. Specifically, selector 12 can be moved to the far right-most position within channel 13 which decouples any of the multi-telephone line sources from passing through stand alone, self-contained switching device 10. Raised dots or indentions could be used for its own housing. LED 14 can act as an indicator of selector 12 being in the "off" position. Preferably, LED indicator 14 would indicate the status of selector 12 as a red LED source.

If one wished to selectively enable one of the three multi-telephone line sources to jumper 8, selector 12 would move to any one of the three positions placed to the left of the "off" position within channel 13 as selector 12 travels therein. If LEDs are employed, at each functional position, LEDs, such as at 15, 16 and 17 will provide indicators of which of the multi-telephone lines are, in fact, being functionally connected through stand-alone, self-contained switching device

10. Ideally, LEDs 15, 16 and 17 would emanate a green light as the corresponding connectivity is established.

Assuming that one of telephone lines 1-3 have been selected by the appropriate positioning of selector 12 within channel 13, one of those multi-telephone line sources emanating from jack 18 would be communicated through jumper 8 and would be available at male connector 21. Male connector 21 could then be received by female port 23 contained within a suitable compatible device 22. Compatible device 22 could be any device utilizing telephone line connectivity, for example, a telephone or telephone base station, computer containing a modem to facilitate dial up access to the world wide web, fax machine or any device that utilizes an analog, digital or other signals, such as a television or phone lines.

Figure 1:
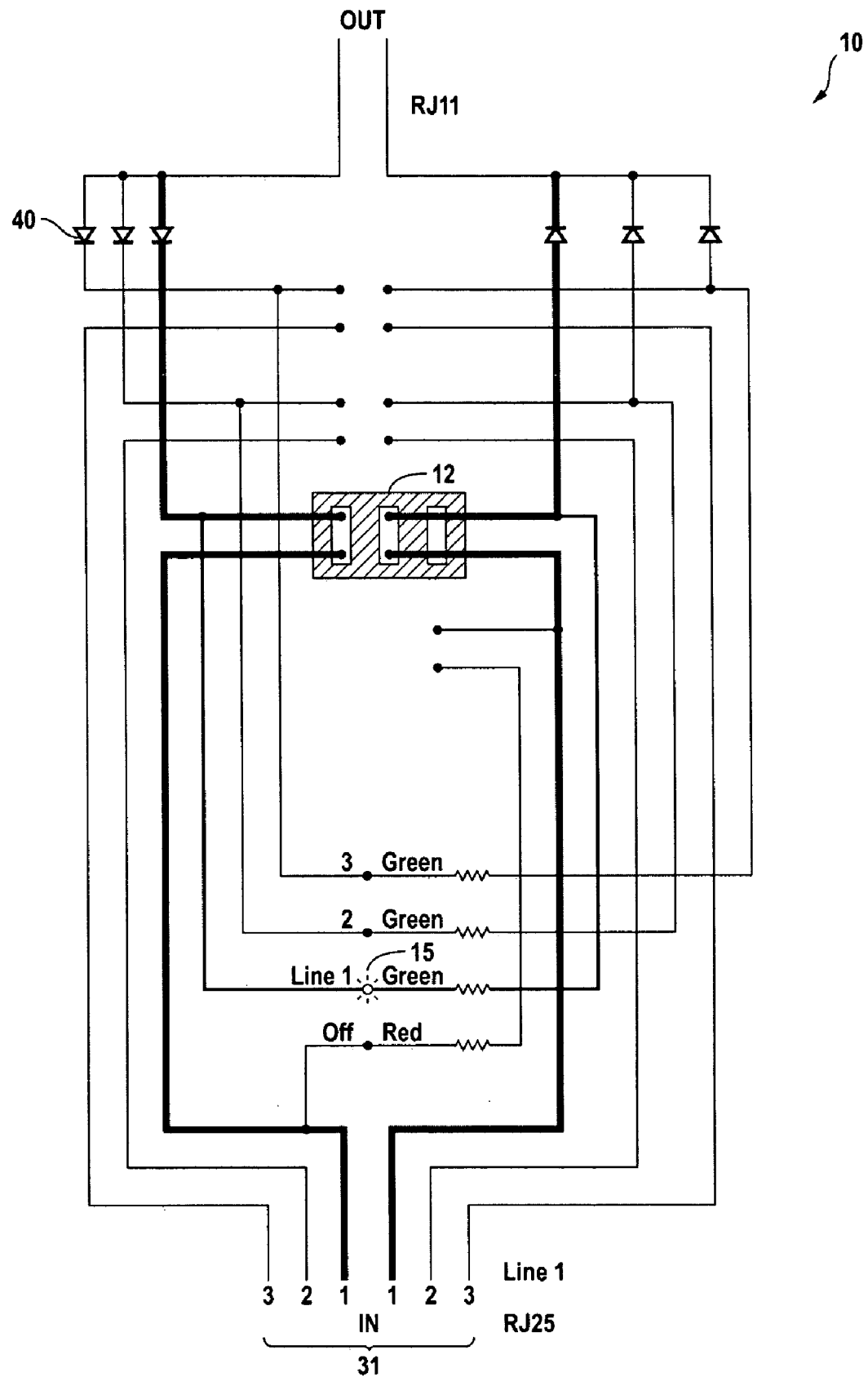
FIGS. 1-4 are schematic diagrams depicting various states of telephone line connectivity in practicing the present invention.

FIGS. 1-4 show, schematically, the internal functionality of which, again, can be incorporated within any compatible device, thus obviating the need for its own external housing. Referring to FIG. 1, selector 12 is shown bridging typical tip and ring pair connectors at 31 corresponding to the output from male connector 20 of FIG. 5. It is noted that as conductors corresponding to input line 1 are bridged thus providing for functional connectivity thereto, green LED 15 is also connected to the circuit and powered by the typical operating line voltage, nominally −48 or −24 volts across the tip and ring pair of the land line which line connection is made through diodes 40. Alternatively, LED 15, as well as the remaining LEDs shown as constituting stand-alone, self-contained switching device 10 could alternatively be powered by an internal battery source (not shown) thus reducing the burden upon the line voltage if desired. Providing a suitable battery source would be quite apparent to one skilled in the art.

Figure 2:
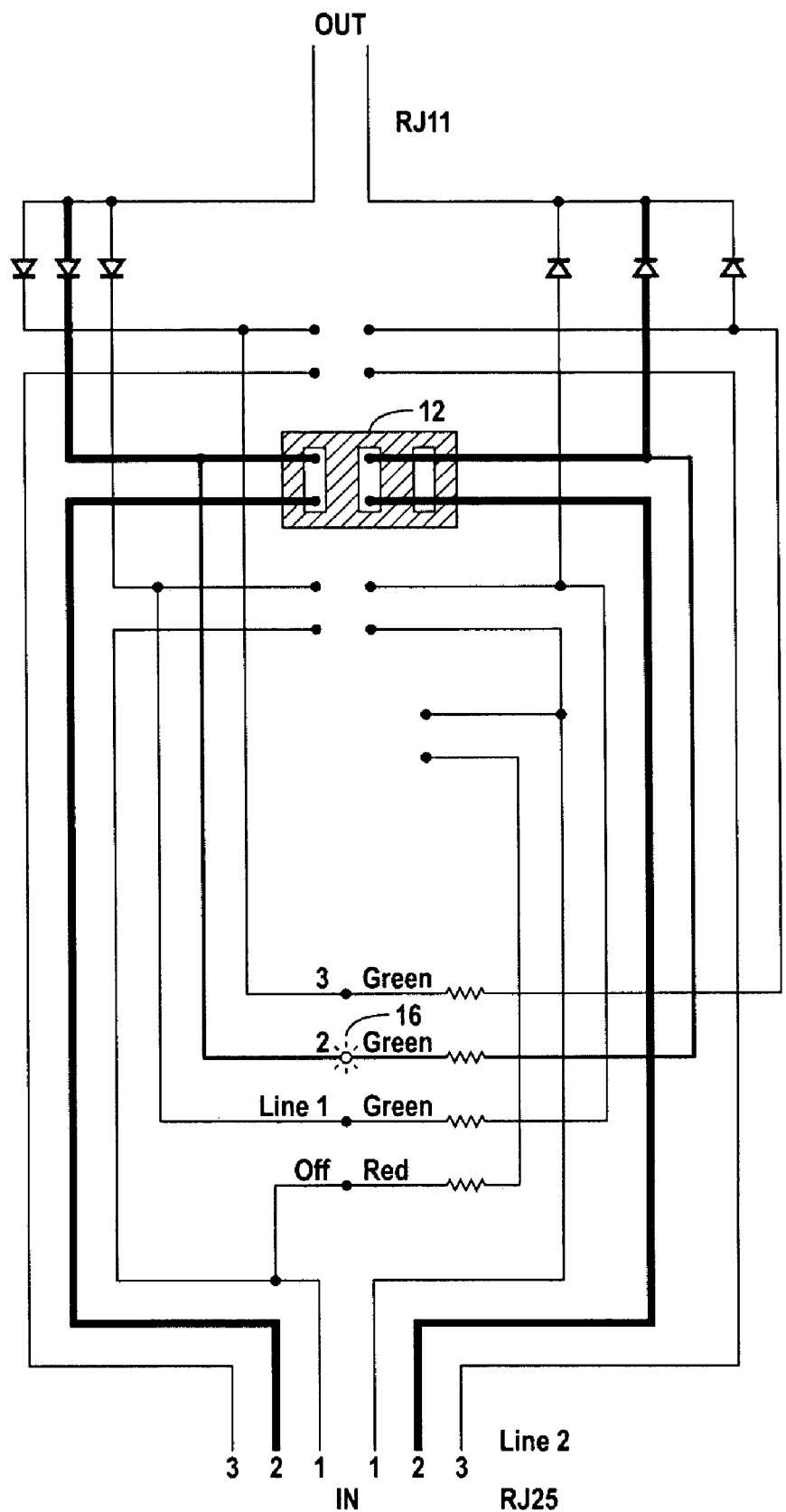

Similarly, FIG. 2 shows selector 12 positioned to connect conductors carrying line 2 through male connector 20 while simultaneously activating green LED 16.

Figure 3:
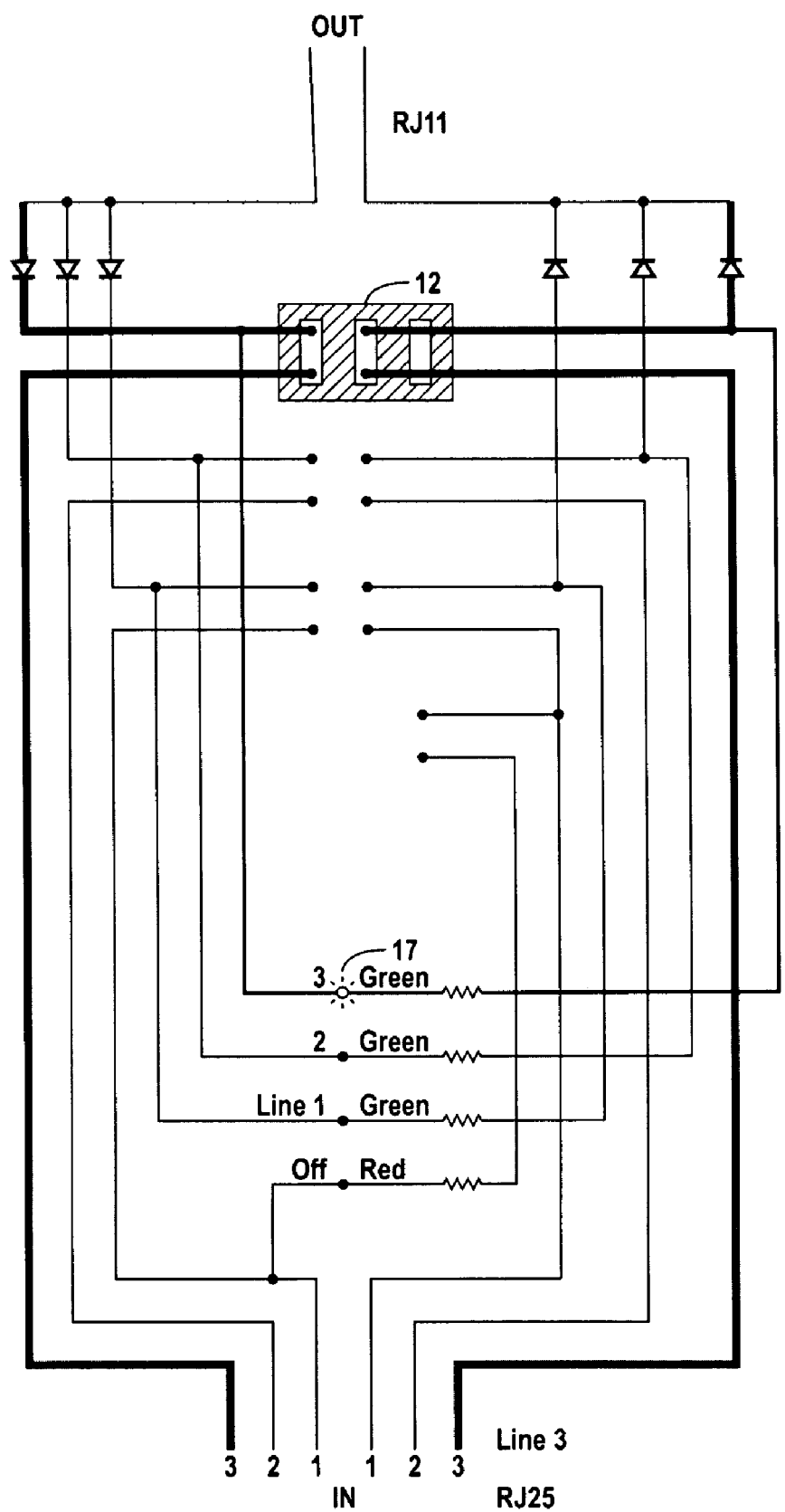

FIG. 3 shows selector 12 further move across channel 13 to bridge the conductors carrying telephone line 3 through diodes 40 while simultaneously activating green LED 17.

Figure 4:
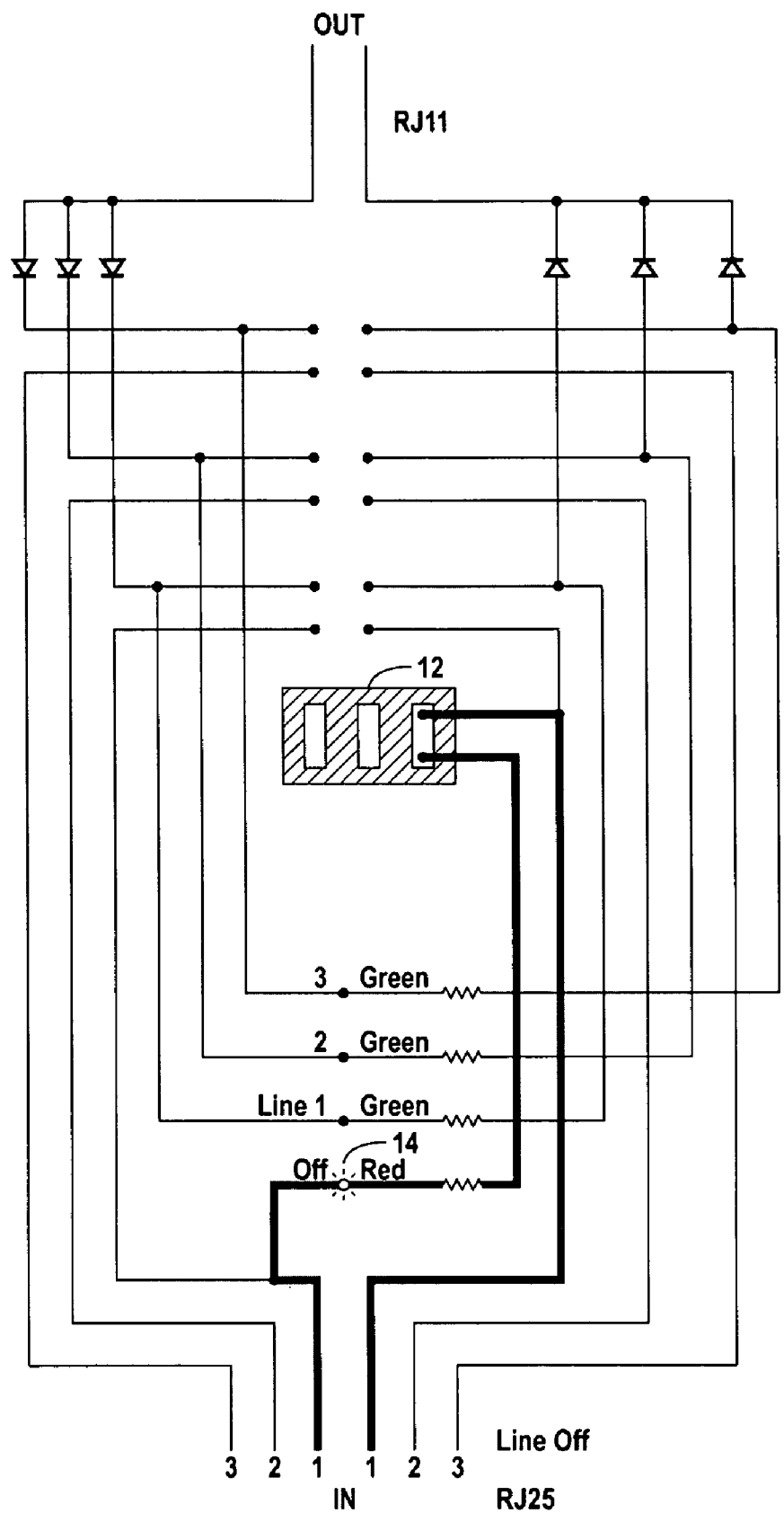

Finally, FIG. 4 shows selector 12 moved to an intermediate position along channel 13 and avoiding bridging contact with any of the conductors of lines 1, 2 or 3 while activating red LED 14 indicating that none of the multi-telephone line sources have been enabled by switching device 10 to pass through such device to jumper 8.

Although the utility of the present device should perhaps be self-evident, the following is noted. Firstly, being a stand-alone device, the present invention can be employed with virtually any compatible apparatus designed to receive and to interface with any telephone line. No longer does one need to consider selective multi-line capability in addressing functionality of such devices.

Secondly, in using the present invention, one can, for example, switch lines or terminate a dial tone or contact with a data-transferring line source without unplugging the compatible device from a wall outlet or jack. As such, multiple phones and other compatible devices such as fax machines and computer modems can be installed in various locations within a single facility wherein the present device is provided on the telephone line attached to each such compatible device either selected to its "off" position or providing functionality to the various multi-telephone lines enabling each such compatible device to operate independently of the remaining devices therein.

Thirdly, the present invention has particular application when providing selective connectivity to such compatible devices such as computer modems and fax machines. Quite often, in a multi-line installation in which a computer has been connected, through its modem, for dial-up access to the world wide web, a busy signal can often times be encountered. The present device eliminates this problem by enabling the user to select a line. Placing the switch in its "OFF" position terminates the dial tone thereby eliminating the "start mode" a modem must pass through when it has been turned off. Terminating the dial tone also enables the user to determine, selectively, when faxes are to be received. Thus, the disruption of a residence receiving faxes in the middle of the night is eliminated when stand-alone, self-contained switching device 10 is set to its "off" position when a user does not wish to receive faxes.

Further, as is quite evident, by employing the present invention, one can rapidly switch between available lines when necessary, even when employing devices which have no internal switching capability of their own. Thus, if line 1 has been established to interface with a computer modem and line 2 has been selected to interface with a fax machine, line 3 could be established through the appropriate movement of selector 12 within channel 13 to interface with a telephone or a telephone base station while each of these compatible devices remains unaffected. In doing do, a user can determine line status at each compatible device at a glance by merely reviewing the status of the various LEDs.

The above-described preferred embodiments have been noted only by way of example, and those skilled in the art will readily recognize numerous other embodiments within the scope of the subject invention. Accordingly, the limitations on the scope of the subject invention are to be found only in the claims set forth as follows.

The invention claimed is:

1. A stand alone, self contained switching device for providing selective telephone and data line access to multi-telephone and data line sources, said device comprising a housing, an input port for receiving multiple telephone lines and an output port for connecting a compatible device to one of said telephone or data lines, switching means for enabling a user to selectively connect said compatible device to one of said multi-telephone or data line sources and to enable a user to selectively block access to said multi-telephone line sources, and indicator means for identifying which of said multi-telephone or data sources is being connected to said compatible device and whether access is blocked to said multi-telephone line or data sources.

2. The stand-alone, self contained switching device of claim 1 wherein said indicator means comprises a series of LEDs.

3. The stand-alone, self contained switching device of claim 2 wherein said LEDs indicating a selective connection between each of said multi-telephone line or data sources and compatible device is indicated by a green LED and selectively blocking access to said multi-telephone line or data sources is indicated by a red LED.

4. The stand-alone, self contained switching device of claim 1 wherein said switching means comprises a slide switch for selectively connecting said compatible device to one of said multi-telephone line or data sources.

5. The stand-alone, self contained switching device of claim 2 wherein said LEDs are powered by said multi-telephone line or data sources.

6. The stand-alone, self contained switching device of claim 2 wherein said LEDs are powered by a battery contained within said housing.

7. The stand-alone, self-contained switching device of claim 1 wherein said multi-telephone and data lines comprise up to three multiple telephone lines and optionally at least one data line.

8. In combination a computer and stand-alone, self-contained switching device for providing selective telephone line connectivity between a modem contained within said computer and multi-telephone sources, said device comprising a housing, an input port for receiving multiple telephone lines and an output port for connecting said multi-telephone line sources to said modem, switching means enabling a user to selectively connect said modem to one of said multi-telephone sources and to enable a user to selectively block access to said multi-telephone line sources, an indicator means for identifying which of said multi-telephone line sources is being connected to said modem and whether access is being blocked to said multi-telephone line sources.

9. The combination computer and stand-alone, self-contained switching device of claim 8 wherein said indicator means comprises a series of LEDs.

10. The combination computer and stand-alone, self-contained switching device of claim 9 wherein said LEDs indicating a selective connection between each of said multi-telephone line sources and modem is indicated by a green LED and selectively blocking access to said multi-line sources as indicated by a red LED.

11. The stand-alone, self-contained switching device of claim 8 wherein said switching means comprises a slide switch for selectively connecting said modem to one of said multi-telephone line sources.

12. The stand-alone, self-contained switching device of claim 9 wherein said LEDs are powered by said multi-telephone line sources.

13. The stand-alone, self-contained switching device of claim 9 wherein said LEDs are powered by a battery contained within said housing.

14. The stand-alone, self contained switching device of claim 1 wherein said compatible device comprises a member selected from the group consisting of a computer, fax and any machine using a telephone line.

15. A switching device for providing selective telephone and data line access to multi-telephone and data line sources, said device comprises an input for receiving multiple telephone or data lines and an output for connecting a compatible device to one of said telephone or data lines, switching means for selectively connecting said compatible device to one of said multi-telephone or data line sources and for selectively blocking access to said multi-telephone or data line sources, and indicator means for identifying which of said multi-telephone or data line sources is being connected to said compatible device and whether access is blocked to said multi-telephone or data line sources.

16. The switching device of claim 15 wherein said switching device is embedded within said compatible device.

17. The switching device of claim 15 wherein said indicator means comprises a series of LEDs.

18. The switching device of claim 15 wherein said multi-telephone lines comprise up to three such telephone lines and optionally at least one data line.

19. The switching device of claim 15 wherein said compatible device comprises a computer modem.

* * * * *